Jan. 19, 1932.   J. P. SELLMER   1,841,642
AIRPLANE
Filed May 10, 1930
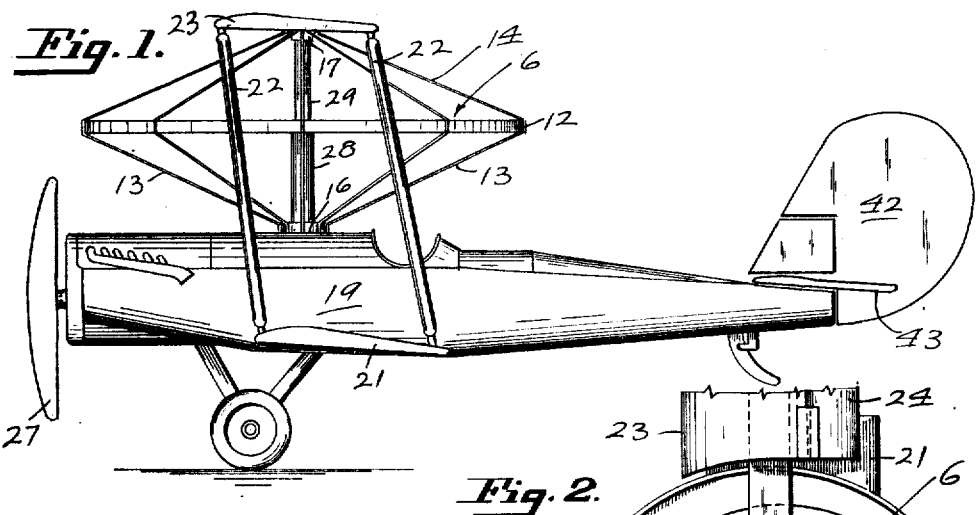
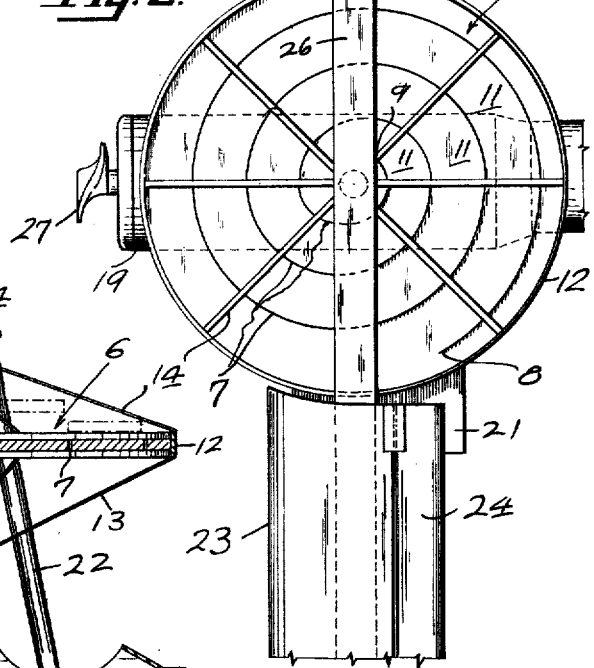
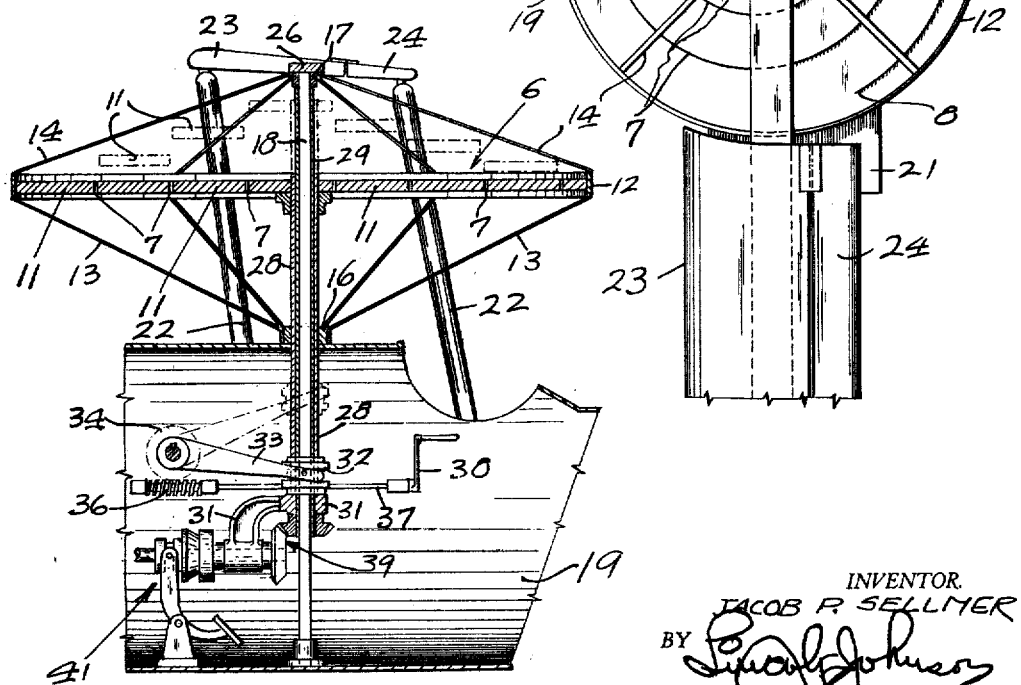
INVENTOR.
JACOB P. SELLMER
BY
ATTORNEYS.

Patented Jan. 19, 1932

1,841,642

UNITED STATES PATENT OFFICE

JACOB P. SELLMER, OF STINSON BEACH, CALIFORNIA

AIRPLANE

Application filed May 10, 1930. Serial No. 451,346.

This invention relates to aircraft.

It is the primary object of the invention to provide a rotating air foil, or air screw for aircraft, and particularly for heavier than air craft, for lifting the aircraft by reason of the lift reaction or thrust of rotary air foils, thereby to enable the aircraft to rise and descend vertically and to hover above the ground, said air foil or air screw being formed of a disc with a spiral cut thru the faces thereof, dividing the disc into a continuous spiral strip or ribbon which, when collapsed, forms a continuous plane; means being provided to hold the rim of the disc when the center of the spiral is forced out of the plane of the disc, to form a spiral cone out of the horizontal rounds of the spiral strip.

Another object of the invention is the provision of an air foil which is formed of a disc by cutting the disc into a continuous spiral strip extending from its outer periphery toward its center, the aerofoil being disposed opposite a space between the sustaining planes or wings of the airplane; the rim of the disc being held in a constant level relatively to the said wings; means being provided to force the center of the spiral upwardly to form a vertical air screw, to which rotation is imparted at will during the rise or descent of the plane. In its collapsed position, the aerofoil is adapted to cooperate with the wings and with the usual propeller of the airplane, to operate as a sustaining plane, receiving the thrust from said usual propeller.

Other objects and advantages are to provide aircraft that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings wherein,

Fig. 1 is a side view of an airplane, with my aerofoil thereon,

Fig. 2 is a top plane view of the airplane and the aerofoil; and

Fig. 3 is a vertical sectional view of the airplane, showing the aerofoil and its operating mechanism in section.

The advantage of a helicopter over the usual airplane resides in its ability to rise and descend vertically. However, the usual type of helicopter is maintained in the air by its rotating air screw exclusively. In my invention the air screw is used primarily for lifting the airplane off the ground, to a certain altitude, thereafter the airplane is to be maintained and propelled in the air in the usual manner. For this purpose I provide an air screw, which is adapted to operate as a sustaining plane when in inoperative position. The air screw or aerofoil 6 of my invention comprises a flat disc which has a spiral cut 7 thru the face of the disc, extending from a point 8 adjacent the outer periphery of the disc, spirally toward the center of the disc to a point 9 adjacent said center so as to cut the disc into a continuous spiral strip or ribbon, the rounds 11 of which are of substantially equal width and are in the same plane when collapsed.

On the outer periphery of the disc is fixed a rim 12 which is held at constant level relatively to the respective aircraft, by means of brace members 13 and 14. The members 13 extend from the rim 12 downwardly to a collar 16, and the members 14 extend upwardly to a collar 17. The collars 16 and 17 are rotatable on a fixed standard 18, which latter extends thru the center of the disc.

In order to render the disc operative as an air screw, it is necessary to force the center of the spiral strip out of the plane of the disc, thereby forcing the spiral strip into a helical cone formed by substantially parallel, horizontal, flat rounds of the spiral strip. If the air screw is held in this extended position and rotation is imparted thereto, it will screw itself into the air and lift the aircraft, or retard the descending of the aircraft, as the case may be.

In the present construction the aircraft used is the usual airplane. The fuselage 19 has comparatively short lower stub wings 21 on the opposite sides thereof, merely to provide a support for struts 22 on which is secured the sustaining plane or wing 23 of the airplane. The opposite ends of the trailing edges of the wing 23 have the usual ailerons 24 thereon. The sustaining plane or wing 23 is cut away at a point intermediate its center above the fuselage 19 to leave a free space above the air screw 6 allowing the free operation thereof. A cross member 26 extending laterally thru the space between the wing sections, connects the same and has the upper end of the standard 18 fixed therein. The lower end of the standard 18 is fixed onto the floor of the fuselage 19.

The airplane is provided with the usual tractor propeller 27 to cooperate with the wing 23 and with the collapsed, stationary air screw 6 when the airplane is in flight. It is to be noted that it is desirable to rotate the extended air screw 6 during rising and descent, and to collapse the air screw 6 during the flight in the air so as to offer additional sustaining plane for the airplane, opposite the space where the wing 23 is interrupted.

The telescoping of the air screw 6 is accomplished by the use of a sleeve 28, which is slidable on an inner sleeve 29, which latter is rotatable, but not slidable, on the standard 18. The sleeves 28 and 29 are keyed to each other to rotate together. The sleeve 28 extends only to the center of the air screw 6 and is fixedly secured thereto. The lower end of the inner sleeve 29 is supported in a bracket 31 fixed on the fuselage 19. Above the bracket is a collar 32 secured to the lower end of the outer sleeve 28.

In order to extend the air screw 6, a lifting mechanism is provided which consists of a lever 33 fulcrumed on the side of the fuselage 19. The free end of the lever 33 is formed into a yoke to engage an annular groove on the collar 32 for moving the same vertically, yet permitting the rotation of the collar 32 with the sleeves 28 and 29. On the fulcrum of the lever 33 is a gear 34 in mesh with a worm 36 journaled in suitable bearings on the fuselage 19. The worm 36 is operated by a shaft 37 having a crank 38 at the end thereof.

When the crank 38 is rotated, the rotation is transmitted to the worm 36 and gear 34 so as to turn the lever 33 around its fulcrum. When the lever 33 is turned upwardly into the dotted line position, shown in Fig. 3, it lifts the collar 32 therewith thereby raising the outer sleeve 28, the upper end of which forces the center of the spiral strip out of the plane of the disc, so that the rounds of the spiral assume substantially the positions indicated in dash and dot lines in Fig. 3. The worm 36 and gear 34 are self locking so as to hold the air screw 6 in extended position.

Rotation is imparted to the extended air screw 6 thru bevel gearing 39 which is connected by means of a usual clutch mechanism 41 to a prime mover, not shown. The clutch 41 may connect to the usual engine of the airplane.

It is to be noted that the collar 16 is slidably keyed to the outer sleeve 28 and is held in a suitable bearing on the top of the fuselage 19. The collar 17 is keyed to the inner sleeve 29. In this manner rotative power is transmitted to the collars 16 and 17, whereby rotation is imparted to the rim of the disc as well as to the center of the disc. Thus the air screw is rotated uniformly to create the desired vertical thrust to lift the airplane from the ground.

It is to be understood that the telescoping and rotating mechanisms herein described, are for the purpose of illustration to show an embodiment of the invention, and other suitable operating mechanisms for the air screw may be adopted. It is also to be understood that the same principle of operation may be applied to different types of aircraft, not only to the airplane shown.

In operation the air screw 6 is extended before the airplane leaves the ground or before it lands, rotation is imparted thereto so that it lifts the airplane vertically or slightly retards its vertical drop as the case may be. The speed of rotation of the air screw is to be controlled in the customary manner. After the airplane reaches a desired altitude, the traction propeller 27 is operated, and the air screw is telescoped into collapsed position, and brought to a standstill by disconnecting the power therefrom, so as to operate as an additional sustaining plane, cooperating with the traction propeller, at a point where the wings of the airplane are interrupted.

The airplane is controlled in other respects in the usual manner by means of its rudder 42 and elevator 43.

Having thus described this invention, what I claim and desire to secure by Letters Patent is:

1. A rotary aerofoil comprising a substantially flat disc having a spiral cut thru the face thereof to divide the disc into a continuous spiral strip from the outer periphery toward its center, the center of the spiral strip being adapted to be forced out of the plane of the disc above the rim of the disc, thereby to form a conical spiral aerofoil, for lifting an aircraft into the air when rotated.

2. A rotating aerofoil formed by a continuous spiral strip having the flat faces thereof in the plane of the disc, means to hold the outer periphery of the disc in a constant plane relatively to an aircraft; and means to force the spiral strip out of its collapsed disc plane into a conical helix and to rotate the entire disc on the aircraft thereby to lift the aircraft into the air.

3. In combination with an aircraft, a rotating aerofoil comprising a substantially flat disc having a spiral cut thru the face thereof to divide the disc into a continuous spiral strip from the outer periphery toward its center, the center of the spiral strip being adapted to be forced out of the plane of the disc above the rim of the disc, thereby to form a conical spiral aerofoil; means on the aircraft to rotatably support the outer periphery of the disc on the aircraft; means to force the center of the disc out of the plane of the disc to form the disc into a helical cone, and means on the aircraft to rotate said aerofoil to lift the aircraft into the air.

4. In combination with an aircraft, a rotating aerofoil comprising a substantially flat disc having a spiral cut thru the face thereof to divide the disc into a continuous spiral strip from the outer periphery toward its center, the center of the spiral strip being adapted to be forced out of the plane of the disc above the rim of the disc, thereby to form a conical spiral aerofoil; means on the aircraft to rotatably support the outer periphery of the disc on the aircraft; means to force the center of the disc out of the plane of the disc to form the disc into a helical cone; means on the aircraft to rotate said aerofoil to lift the aircraft into the air; sustaining planes on the aircraft; and a usual propeller on the aircraft to cooperate with the said sustaining planes.

5. In combination with an aircraft, a rotating aerofoil comprising a substantially flat disc having a spiral cut thru the face thereof to divide the disc into a continuous spiral strip from the outer periphery toward its center, the center of the spiral strip being adapted to be forced out of the plane of the disc above the rim of the disc, thereby to form a conical spiral aerofoil; means on the aircraft to rotatably support the outer periphery of the disc on the aircraft; means to force the center of the disc out of the plane of the disc to form the disc into a helical cone; means on the aircraft to rotate said aerofoil to lift the aircraft into the air; sustaining planes on the aircraft; and a usual propeller on the aircraft to cooperate with the said sustaining planes, said disc being disposed in a constant plane relatively to the sustaining planes to form an additional sustaining plane when collapsed into its disc shape.

6. In combination with an aircraft, a rotating aerofoil comprising a substantially flat disc having a spiral cut thru the face thereof to divide the disc into a continuous spiral strip from the outer periphery toward its center, the center of the spiral strip being adapted to be forced out of the plane of the disc above the rim of the disc, thereby to form a conical spiral aerofoil; means on the aircraft to rotatably support the outer periphery of the disc on the aircraft; means to force the center of the disc out of the plane of the disc to form the disc into a helical cone; means on the aircraft to rotate said aerofoil to lift the aircraft into the air; sustaining planes on the aircraft extending in opposite directions on opposite sides of the aerofoil so as to leave the space between the inner ends of the sustaining planes free for the thrust produced by the rotating airfoil; and a usual propeller on the aircraft to cooperate with the said sustaining planes.

7. In an aircraft having a fuselage, and forward propelling mechanism on the fuselage, a sustaining plane on the fuselage to cooperate with the propelling mechanism, said sustaining plane being interrupted intermediate its ends, a standard supported on the fuselage below the space between the sections of the interrupted sustaining plane, an air screw rotatably mounted on the standard to exert a vertical thrust to lift the aircraft into the air; means on the aircraft to impart rotation to the air screw, said air screw being collapsible into the form of a disc opposite the space between the sustaining planes, to provide an additional sustaining plane when collapsed; and means to expand and collapse said air screw.

8. In an aircraft having a fuselage, and forward propelling mechanism on the fuselage, a sustaining plane on the fuselage to cooperate with the propelling mechanism, said sustaining plane being interrupted intermediate its ends, a standard supported on the fuselage below the space between the sections of the interrupted sustaining plane, an air screw rotatably mounted on the standard to exert a vertical thrust to lift the aircraft into the air; means on the aircraft to impart rotation to the air screw, said air screw comprising a subsantially flat disc having a spiral cut therethru to divide the disc into a continuous flat spiral strip extending from the outer periphery of the disc toward its center, and means to force the center of the disc upwardly out of the plane of the disc to form a conical, spiral air screw.

9. In an aircraft having a fuselage, and forward propelling mechanism on the fuselage, a sustaining plane on the fuselage to cooperate with the propelling mechanism, said sustaining plane being interrupted intermediate its ends, a standard supported on the fuselage below the space between the sections of the interrupted sustaining plane, an air screw rotatably mounted on the standard to exert a vertical thrust to lift the aircraft into the air; means on the aircraft to impart rotation to the air screw, said air screw comprising a substantially flat disc having a spiral cut therethru to divide the disc into a continuous flat spiral strip extending from the outer periphery of the disc toward its center; and means to force the center of the disc upwardly out of the plane of the disc to form a conical, spiral air screw, the center of said spiral being guided on said standard.

10. In an aircraft having a fuselage, and forward propelling mechanism on the fuselage, a sustaining plane on the fuselage to cooperate with the propelling mechanism, said sustaining plane being interrupted intermediate its ends, a standard supported on the fuselage below the space between the sections of the interrupted sustaining plane, an air screw to lift the aircraft into the air; means on the aircraft to impart rotation to the air screw, said air screw comprising a substantially flat disc having a spiral cut therethru to divide the disc into a continuous flat spiral strip extending from the outer periphery of the disc toward its center; and means to force the center of the disc upwardly out of the plane of the disc to form a conical, spiral air screw, the center of said spiral being guided on said standard, said disc being substantially in the level of said interrupted sustaining plane to complement the same in its collapsed position.

11. In an aircraft having a fuselage, and forward propelling mechanism on the fuselage, a sustaining plane on the fuselage to cooperate with the propelling mechanism, said sustaining plane being interrupted intermediate its ends, a standard supported on the fuselage below the space between the sections of the interrupted sustaining plane, an air screw rotatably mounted on the standard to exert a vertical thrust to lift the aircraft into the air; means on the aircraft to impart rotation to the air screw, said air screw comprising a substantially flat disc having a spiral cut therethru to divide the disc into a continuous flat spiral strip extending from the outer periphery of the disc toward its center; and means to force the center of the disc upwardly out of the plane of the disc to form a conical, spiral air screw, said last mentioned means being adapted to hold the air screw in extended position.

12. In an aircraft having a fuselage, and forward propelling mechanism on the fuselage, a sustaining plane on the fuselage to cooperate with the propelling mechanism, said sustaining plane being interrupted intermediate its ends, a standard supported on the fuselage below the space between the sections of the interrupted sustaining plane, an air screw rotatably mounted on the standard to exert a vertical thrust to lift the aircraft into the air; means on the aircraft to impart rotation to the air screw, said air screw comprising a substantially flat disc having a spiral cut therethru to divide the disc into a continuous flat spiral strip extending from the outer periphery of the disc toward its center; means to force the center of the disc upwardly out of the plane of the disc to form a conical, spiral air screw, said last mentioned means being adapted to hold the air screw in extended position; and a clutch mechanism to operatively connect the said rotating means to the air screw, at will.

13. In an aircraft having a fuselage, and forward propelling mechanism on the fuselage, a sustaining plane on the fuselage to cooperate with the propelling mechanism, said sustaining plane being interrupted intermediate its ends, a standard supported on the fuselage below the space between the sections of the interrupted sustaining plane, an air screw rotatably mounted on the standard to exert a vertical thrust to lift the aircraft into the air; means on the aircraft to impart rotation to the air screw; means to rotatably hold the rim of the air screw at a constant level relatively to the fuselage, said air screw being collapsible into the form of a disc opposite the space between the sustaining planes to provide an additional sustaining plane when collapsed; and means to expand and collapse said air screw.

14. In an aircraft having a fuselage, and forward propelling mechanism on the fuselage, a sustaining plane on the fuselage to cooperate with the propelling mechanism, said sustaining plane being interrupted intermediate its ends, a standard supported on the fuselage below the space between the sections of the interrupted sustaining plane, an air screw rotatably mounted on the standard to exert a vertical thrust to lift the aircraft into the air; means on the aircraft to impart rotation to the air screw; means to rotatably hold the rim of the air screw at a constant level relatively to the fuselage, said air screw comprising a substantially flat disc having a spiral cut therethru to divide the disc into a continuous flat spiral strip extending from the outer periphery of the disc toward its center; and means to force the center of the disc upwardly out of the plane of the disc to form a conical, spiral air screw.

15. In an aircraft having a fuselage, and forward propelling mechanism on the fuselage, a sustaining plane on the fuselage to cooperate with the propelling mechanism, said sustaining plane being interrupted intermediate its ends, a standard supported on the fuselage below the space between the sections of the interrupted sustaining plane, an air screw rotatably mounted on the standard to exert a vertical thrust to lift the aircraft into the air; means on the aircraft to impart rotation to the air screw; means to rotatably hold the rim of the air screw at a constant level relatively to the fuselage, said air screw comprising a substantially flat disc having a spiral cut therethru to divide the disc into a continuous flat spiral strip extending from the outer periphery of the disc toward its center; and means to force the center of the disc upwardly out of the plane of the disc to form a conical, spiral air screw, the center of said spiral being guided on said standard.

In testimony whereof, I have hereunto set my hand at Stinson Beach, California, this 20th day of March, 1930.

JACOB P. SELLMER.